United States Patent
Mannheim Astete et al.

(10) Patent No.: US 12,330,396 B2
(45) Date of Patent: Jun. 17, 2025

(54) HYBRID ASYMMETRIC AUTOMOTIVE LAMINATE

(71) Applicant: AGP America S.A., Ciudad de Panama (PA)

(72) Inventors: Mario Arturo Mannheim Astete, Lima (PE); Osmar Curi Grados, Lima (PE); Vincenzo Mannino, Lima (PE)

(73) Assignee: AGP America S.A., Ciudad de Panama (PA)

(*) Notice: Subject to any disclaimer, the term of this patent is extended or adjusted under 35 U.S.C. 154(b) by 237 days.

(21) Appl. No.: 18/003,901

(22) PCT Filed: Jul. 2, 2021

(86) PCT No.: PCT/IB2021/055980
§ 371 (c)(1),
(2) Date: Dec. 29, 2022

(87) PCT Pub. No.: WO2022/003650
PCT Pub. Date: Jan. 6, 2022

(65) Prior Publication Data
US 2023/0264455 A1    Aug. 24, 2023

Related U.S. Application Data

(60) Provisional application No. 63/047,574, filed on Jul. 2, 2020.

(30) Foreign Application Priority Data

Nov. 27, 2020   (DE) .................... 20 2020 106 850.4

(51) Int. Cl.
*B32B 7/12*      (2006.01)
*B32B 17/10*     (2006.01)
(Continued)

(52) U.S. Cl.
CPC .......... *B32B 17/10064* (2013.01); *B32B 7/12* (2013.01); *B32B 17/10293* (2013.01);
(Continued)

(58) Field of Classification Search
CPC ........ B32B 17/10036; B32B 17/10064; B32B 17/10091; B32B 17/1011; B32B 17/10119; B32B 17/10137; B32B 17/10155; B32B 17/10293; B32B 17/10366; B32B 17/10761; B32B 2250/03; B32B 2305/08;
(Continued)

(56) References Cited

PUBLICATIONS

Benedetto et al. WO 2019/186115 A1 (Year: 2019).*

* cited by examiner

*Primary Examiner* — Lawrence D Ferguson
(74) *Attorney, Agent, or Firm* — The Morales Law Firm; Joseph L. Morales, Esq.

(57) ABSTRACT

The laminated glazing proposed in this invention has an outer glass layer (201) with holes (20) and a thin inner facing glass layer (202) with shorter length dimension whereas the bottom edge (30) does not have holes on it and which does not overlap with the holes (20) in the outer glass layer (201). One or more retention layers (36), comprising reinforcement and adhesive layers, serve to connect the glazing mounting means (32) to both of the glass layers (201, 202) providing a thin laminated glazing with holes (20) that in the event of failure is retained by the mounting means (32).

19 Claims, 14 Drawing Sheets

(51) Int. Cl.
*B32B 27/18* (2006.01)
*B32B 27/28* (2006.01)

(52) U.S. Cl.
CPC ............ *B32B 27/18* (2013.01); *B32B 27/281* (2013.01); *B32B 2250/03* (2013.01); *B32B 2305/08* (2013.01); *B32B 2605/00* (2013.01)

(58) Field of Classification Search
CPC .......... B32B 2307/732; B32B 2605/00; B32B 27/18; B32B 27/281; B32B 3/06; B32B 3/085; B32B 3/266; B32B 7/08; B32B 7/12

See application file for complete search history.

HYBRID ASYMMETRIC AUTOMOTIVE LAMINATE

Laminated automotive glazing, earlier on limited to just the windshield, is currently being used in more and more positions. Designing and manufacturing a laminate, that can serve as a direct replacement for tempered automotive glass pane, can be challenging. It is difficult to produce a thin laminated glazing with holes. The laminated glazing proposed in this invention has an outer glass layer with holes and a thin inner facing glass layer with shorter length dimension whereas the bottom edge does not have holes on it and which does not overlap with the holes in the outer glass layer. One or more retention layers, comprising reinforcement and adhesive layers, serve to connect the glazing mounting means to both of the glass layers providing a thin laminated glazing with holes that in the event of failure is retained by the mounting means. The invention provides a laminated direct replacement for a tempered glazing with all of the advantages of a laminate while maintaining reliability and utility of a tempered part.

FIELD OF THE INVENTION

This invention relates to the field of laminated automotive glazing.

BACKGROUND OF THE INVENTION

A trend in the automotive industry has been the expanded use of laminated glazing. Laminated glazing, once limited to just the windshield position of the vehicle, is finding more and more application in other positions in the vehicle where it serves to improve passenger safety, security, and comfort as well as energy efficiency.

Laminated windshields are made by bonding two sheets of annealed glass together using a thin sheet of a transparent thermo plastic. Annealed glass is glass that has been slowly cooled from the bending temperature down through and below the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. On impact, the plastic layer also helps to prevent penetration by the occupant in the event of a crash and by objects striking the laminate from the exterior of the vehicle.

Regulatory requirements stipulate that heat strengthened (tempered) glass can be used in all vehicle positions other than the windshield. Heat strengthened glass has a layer of high compression on the outside surfaces of the glass, balanced by tension on the inside of the glass. When tempered glass breaks, the tension and compression are no longer in balance and the glass breaks into small beads with dull edges. Tempered glass is much stronger than annealed laminated glass. However, the minimum glass thickness limits of the typical automotive heat strengthening process are in the 2.6 mm to 3.0 mm range. Thinner glass cannot be strengthened to the level needed to meet the regulatory requirements for safety glazing with the conventional low-pressure air tempering systems in common use in the automotive glass industry.

The glass used in the doors, rear and side windows of most vehicles is made from tempered glass. While laminated glass is allowed for these positions, tempered glass can be produced at a much lower cost than laminated glass. There are some drawbacks to tempered glass. While tempered glass can withstand high loads, it is easily broken when hit with a sharp and hard object. When tempered glass fails, the entire window opening is left unprotected.

As a result, on some vehicles, laminated glass has been used for the doors and some other positions in place of tempered glass. This is in part to improve the safety and security of the occupants. Fixed laminated glass improves occupant retention in the event of a rollover accident. It also takes much longer to break into a vehicle with laminated glass making the vehicle more secure from attack. Laminated glass also provides improved sound dampening for a quieter ride. The soft plastic interlayer acoustically decouples the two glass layers which helps to reduce the transmission of sound through the glass. Improvements of greater than 6 dB have been recorded. A laminate also allows for the use of heat reflecting coatings and films, which require lamination to protect the coating/film, for improved solar control.

Problems are encountered designing a laminated version of a tempered part when the tempered part has holes. Holes are commonly used in tempered parts to attach and mount the glass to the glass mounting means of the vehicle. Laminated glass typically is not manufactured with holes for a number of reasons. The primary one is that annealed glass is not as strong as tempered glass. Fully tempered glass is 4 to 5 times stronger than annealed laminated glass. As mentioned, glass that is less than 2.6 mm thick cannot be fully tempered. Thus, a laminated version of a tempered part will have a higher probability of breakage specifically on positions close to the holes and may not be possible to use in some applications such as frameless door windows.

Looking at glass at the molecular level, we would expect the strength of glass to be in the 45 GPa range. However, we find that the actual strength is orders of magnitude lower than the predicted potential strength. The raw flat glass produced by the float process, appears to be nearly perfect to the naked eye. During manufacture, the glass is inspected by machine and any visible defects are detected and discarded. The near visually perfect glass will still have surface defects at the microscopic level. These come from contact with the float line rollers, cutting, handling, interleaving material, contact with other plates of glass and various other sources. Additional defects are introduced during the glass bending process as well. The distribution of these defect on the surface and severity is random and follows a normal distribution.

Glass has very high compressive strength and almost always fails in tension due to these surface defects. Under compression, these surface defects are forced in the closed direction and cannot open. But, under tension, the surface defects are pulled in the open direction. The surface defects or cracks serve as the weakest link under tension. Due to the near perfect elastic behavior of glass, the glass cannot deform to relieve the stress but instead does the opposite with the defects acting as stress concentrators. Surface defects, most of which are microscopic on new glass, when stressed in the open direction, will grow if the stress is above a certain critical value. This is known as slow crack growth and is not a linear function. Crack growth accelerates with tension and duration.

When a part containing a hole is tempered, the entire surface of the part, including the edges of the hole, is placed in compression. For the part to break, the part must be loaded beyond its compressive strength and placed in tension. This is why tempered parts are so much stronger than annealed glass parts. An annealed part, when loaded, will go into tension at a much lower level.

Another problem is related to the manufacturing tolerance stack. For each hole in the laminate, holes must be drilled in both the inner glass 202 and the outer glass layer 201. Each hole has a location and diameter tolerance plus there is a mismatch tolerance applied to the two glass layers relative to each other in the laminate. As a result, the hole cannot be located as accurately as in a tempered part.

Laminates of the prior art have attempted a number of approaches to solve these problems with varying success.

Many of the vehicles currently in production make use of plastic or metal clips with holes or threaded inserts that are bonded to the laminated glass. The clips subsequently attach to the mounting means in the vehicles. The main drawback to this method, in addition to the added cost and weight is the lack of direct interchangeability with a conventional tempered part with drilled holes. It is also difficult to bond the clip to the glass such that the bond will last the lifetime of the vehicle. The adhesives known and in use are subject to creep and will tend to pull away from the glass over time. Also, the adhesive is subject to long-term environmental degradation in the harsh automotive environment. The inside of a car door can see temperatures in excess of 80° C. on a hot sunny day.

To compensate for the tolerance stack, on some laminated parts with holes, the diameter of the hole is increased. This allows for the fastener to pass through the mounting means but does nothing to address the lack of strength. The overall thickness of the laminate is often increased to improve its strength, but this then requires a design modification onto vehicle glazing openings and moving mechanisms attached to them to accommodate for the greater thickness. This is more of a problem where laminated glazing is offered as an option and does not appear on all of the vehicles produced in that model line.

One innovative method has been to strengthen one or more of the glass layers by means of chemical tempering. This provides greater strength than what can be achieved by heat tempering and allows for the use of thinner glass layers but the hole remains a problem. The mounting means will typically compress the glass placing the areas near the edge of the fastening means in tension which increases the probability of breakage over time. This is in part due to the soft plastic bonding layer used to laminate the glass layers together that when is compressed it deforms and allows the glass layers to deflect. The glass deflection generates a lever and creates torque translated into tension forces on particular locations on the surface of the glass increasing its probability of breakage.

In addition, on movable parts, like side door windows, especially frameless door windows, the glass will experience a torque and bending moment when the glass moves up and down in the channel, when the door is slammed, under wind load and when force is applied to an open window by grabbing, pushing or pulling on the exposed edge.

A number of methods that attempt to overcome this problem involve making the inner glass layer smaller than the outer layer such that the inner layer does not overlap the holes in the outer layer so that the mounting means is only in contact with the stronger outer glass. The drawback of this is that the area where the two layers do not overlap is weaker as compared to the overlapping full laminated portions. In the event of breakage, the non-overlapping area will experience total failure leaving the failed laminated portion separate from the mounting means. This is true of tempered and annealed glass. This non-overlapping monolithic area will also see high torque during operation as the window moves up and down in the case of door windows and other movable positions. It would be desirable to overcome these limitations providing for a laminated glazing with one or more holes that is a direct replacement for a tempered part but with the full benefits in terms of security, safety and comfort as a full laminate.

BRIEF SUMMARY OF THE INVENTION

The invention provides for a laminated glazing with at least one hole. The outer, exterior facing glass layer 201 is fabricated to the nominal glass size with holes drilled as needed.

The inner or interior facing glass layer 202 is cut to size such that the lower edge 30 of the inner glass layer 202 extends below the beltline 24 but does not overlap the hole 20 or holes in the outer glass or the area captured by the mounting means 32. For at least one hole, a retention system 36 (retention means or retention layer) is added. The retention system 36 serves to maintain the mechanical connectivity of the glass layers and the mounting means 32 in the event of a failure. The retention system 36 comprises at least one adhesive layer 28 and at least one reinforcement layer 38. The adhesive layer 28 bonds a reinforcement layer 38 to the inner glass layer 202 and/or to the outer glass layer 201. The retention system 36 overlaps the area captured by the glass mounting means. A portion of the reinforcement layer 38 is extended to the laminated portion, that is, the portion in which the inner 201 and outer glass layers 202 are bonded.

Advantages

Enables use of laminated glazing with holes
Lower distortion
Resistant to breakage.
Direct replacement for tempered part.
Same of better durability as tempered.
Same or less thickness as tempered.
Lower weight.
Improved security.
Improved safety.
Improved comfort.
Superior acoustic dampening.
Superior solar control.
Enables use of ultra-thin glass.
Fabricated using standard automotive glass processes.

DETAILED DESCRIPTION OF THE INVENTION

The following terminology is used to describe the laminated glazing of the invention.

A glazing is an article comprised of at least one layer of a transparent material which serves to provide for the transmission of light and/or to provide for viewing of the side opposite the viewer and which is mounted in an opening in a building, vehicle, wall or roof or other framing member or enclosure.

Laminates, in general, are articles comprised of multiple sheets of thin, relative to their length and width, material, with each thin sheet having two oppositely disposed major faces and typically of relatively uniform thickness, which are permanently bonded to one and other across at least one major face of each sheet.

Figure 14A:
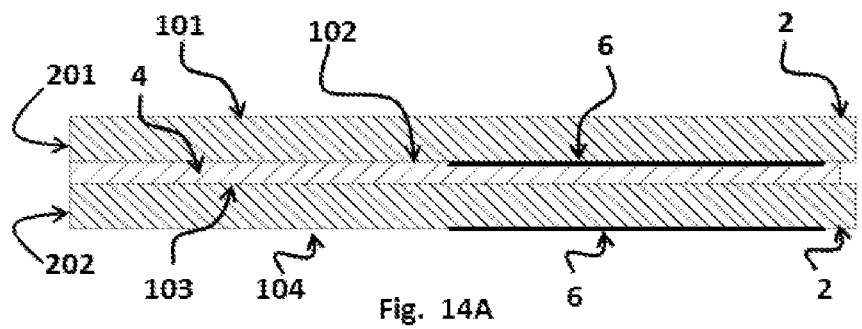
FIG. 14A shows the cross-section of a typical laminated automotive glazing.
Figure 14B:
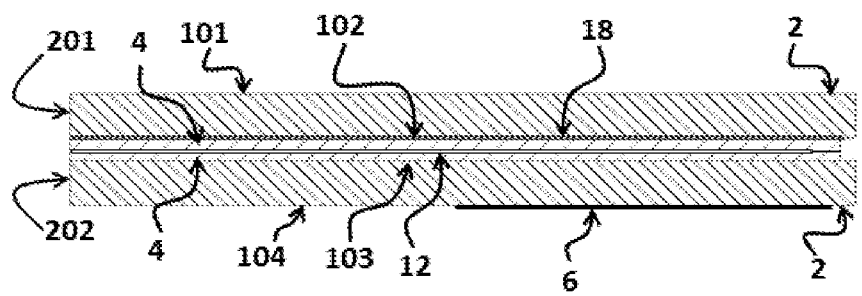
FIG. 14B shows the cross-section of a typical laminated automotive glazing with performance film.

Laminated safety glass is made by bonding two sheets (201 & 202) of annealed glass 2 together using a plastic bonding layer comprised of a thin sheet of transparent thermoplastic 4 (interlayer) as shown in FIGS. 14A and 14B.

Typical automotive laminated glazing cross sections are illustrated in FIGS. 1A and 1B. Laminated safety glass is comprised of two layers of glass, the exterior or outer 201 and interior or inner 202 that are permanently bonded together by a plastic bonding layer 4 (interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic bonding layer 4. An obscuration 6 may be also applied to the glass. Obscurations are commonly comprised of black enamel frit printed on either the surface number two 102 or number four 104 or on both. The laminate may have a coating 18 on one or more of the surfaces. The laminate may also comprise a film 12 laminated between at least two plastic bonding layers 4.

Figure 14C:
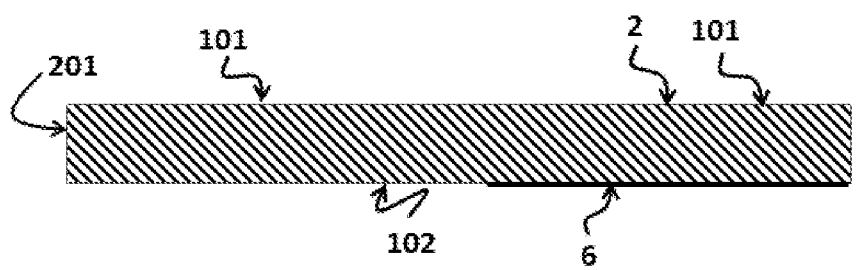
FIG. 14C shows the cross-section of a typical tempered monolithic automotive glazing.

FIG. 14C shows a typical tempered automotive glazing cross section. Tempered glazing is typically comprised of a single layer of glass 201 which has been heat strengthened. The glass surface that is on the exterior of the vehicle is referred to as surface one 101 or the number one surface. The opposite face of the exterior glass layer 201 is surface two 102 or the number two surface. The number two surface 102 of a tempered glazing is on the interior of the vehicle. An obscuration 6 may be also applied to the glass. Obscurations are commonly comprised of black enamel frit printed on the number two 102 surface. The glazing may have a coating on the surface one 101 and/or surface two 102.

The plastic bonding layer 4 has the primary function of bonding the major faces of adjacent layers to each other. The material selected is typically a clear plastic when bonding to another glass layer 2. For automotive use, the most commonly used plastic bonding layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers are available with enhanced capabilities beyond bonding the glass layers together. The invention may include interlayers designed to dampen sound. Such interlayers are comprised whole or in part of a layer of plastic that is softer and more flexible than that normally used.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass including those that are not transparent. The glass layers may be comprised of heat absorbing glass compositions as well as infrared reflecting and other types of coatings.

Most of the glass used for containers and windows is soda-lime glass. Soda-lime glass is made from sodium carbonate (soda), lime (calcium carbonate), dolomite, silicon dioxide (silica), aluminum oxide (alumina), and small quantities of substances added to alter the color and other properties.

Borosilicate glass is a type of glass that contains boric oxide. It has a low coefficient of thermal expansion and a high resistance to corrosive chemical. It is commonly used to make light bulbs, laboratory glassware, and cooking utensils.

Aluminosilicate glass is made with aluminum oxide. It is even more resistant to chemicals than borosilicate glass and it can withstand higher temperatures. Chemically tempered Aluminosilicate glass is widely used for displays on smart phones and other electronic devices.

Lithium-Aluminosilicate is a glass ceramic that has very low thermal expansion and optical transparency. It typically contains 3-6% $Li_2O$. It is commonly used for fireplace windows, cooktop panels, lenses and other applications that require low thermal expansion.

Infrared reflecting coatings include but are not limited to the various metal/dielectric layered coatings applied through Magnetron Sputtered Vacuum Deposition (MSVD) as well as others known in the art that are applied via pyrolytic, spray, CVD, dip and other methods.

Infrared reflecting films include both metallic coated substrates as well as organic based optical films which reflect in the infrared.

The use of thin glass layers has been found to improve resistance to breakage from impact such as from stone chips. The thinner glass is more flexible and absorbs the energy of the impact by deflecting and then bouncing back rather than breaking as it is the case with a thicker stiffer layer of glass. Also, embodiments comprising a borosilicate outer layer are substantially more resistant to impact than soda lime glass due to the nature of the composition. Embodiments comprising a chemically tempered layer will also exhibit superior resistance to impact as compared to ordinary soda-lime glass due to the high surface compression of such glasses.

The glass layers may be formed by any appropriate means known in the art including but not limited to: gravity bending, partial and full surface press bending and singlet bending.

Cold bending is a relatively new technology. As the name suggest, the glass is bent, while cold to its final shape, without the use of heat. On parts with minimal curvature a flat sheet of glass can be bent cold to the contour of the part. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically, or heat strengthened the glass can endure much higher levels of stress and can be bent along both major axes. This process is primarily used to bend chemically tempered thin glass sheets (not more than 1.1 mm thick) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a previously bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together on the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, except for having an unbent glass layer added to the stack of glass.

The beltline is the line formed by the lower visible edge of the vehicle glazing. The beltline of the vehicle front and rear doors is the portion where the door window seals come into contact with the glass. The portion of the door glazing that is below the beltline is not visible.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment.

Heat strengthened, full temper soda-lime float glass, with a compressive strength in the range of at least 70 MPa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression are no longer in balance and the glass breaks into small beads with dull edges. Tempered glass is much stronger than annealed laminated glass. The minimum thickness limits of the typical automotive heat strengthening process are in the 3.2 mm to 3.6 mm range. This is due to the rapid heat transfer that is required. It is not possible to achieve the high surface compression needed with thinner glass using the typical blower type low pressure air quenching systems.

In the chemical tempering process, ions in and near the outside surface of the glass are exchanged with ions that are larger. This places the outer layer of glass in compression. Compressive strengths of up to 1,000 MPa are possible. The typical methods involved submerging the glass in a tank of molten salt where the ion exchange takes place. The glass surface must not have any paint or coatings that will interfere with the ion exchange process.

The invention is comprised of a laminate having two glass layers with each having opposed major faces bonded together permanently by at least one plastic bonding layer and having at least one hole.

The outer layer 201 is cut and the hole or holes are drilled in the same manner as would a standard non-laminated monolithic tempered part.

No holes are cut in the inner glass layer 202. The inner glass layer is cut such that the inner glass layer does not overlap the hole or holes in the outer glass layer and the area captured by the glazing mounting means 32. The edge of the inner glass layer extends below the beltline 24 and preferably to just above the area captured by the glazing mounting means 32. In this manner, the mounting means will only capture the outer glass layer.

The typical edge finish used for laminated and tempered glass is a diamond ground edge with a C shaped profile. This is fine for the outer glass layer. For the inner glass layer, it has been found that the probability of breakage is greatly reduced by offsetting the edge of the inner glass inboard from the edge of the outer glass layer, along at least a portion of the edge including the exposed portion of the edge on movable parts. The larger outer glass layer is thus positioned to protect the thinner and weaker inner glass edge. Further improvement is made by diamond grinding the inner glass edge to a chamfer or for even better results a bullnose shape.

A retention system 36 is fabricated from at least one reinforcement layer and at least one adhesive layer 28. At least one plastic bonding interlayer 4 is needed for the two glass layers of a typical laminate. The at least one adhesive layer 28 of the retention system 36 is used to bond the reinforcement layer 38 to the surface number one 101 and/or number two 102 of the outer glass layer 201 and/or the surface number three 103 and/or number four 104 of the inner glass layer 202.

In several embodiments in which the reinforcement layer 38 is extended to the interior of the laminate, if the reinforcement layer 38 is thin enough, a portion of the plastic bonding interlayer 4 is used as an adhesive layer 28. The portion of the reinforcement layer 38 which is bonded to the two glass layers inside of the laminate must have a thickness that is less than the thickness of the plastic bonding interlayer 4. The portion of the reinforcement layer 38 that is not inside of the laminate may be thicker. In some of these embodiments, to accommodate the reinforcement layer 38, the edge of the plastic bonding interlayer 4 is slit such that the reinforcement layer 38 is inserted in said slit (not shown in Figures).

Figure 13:
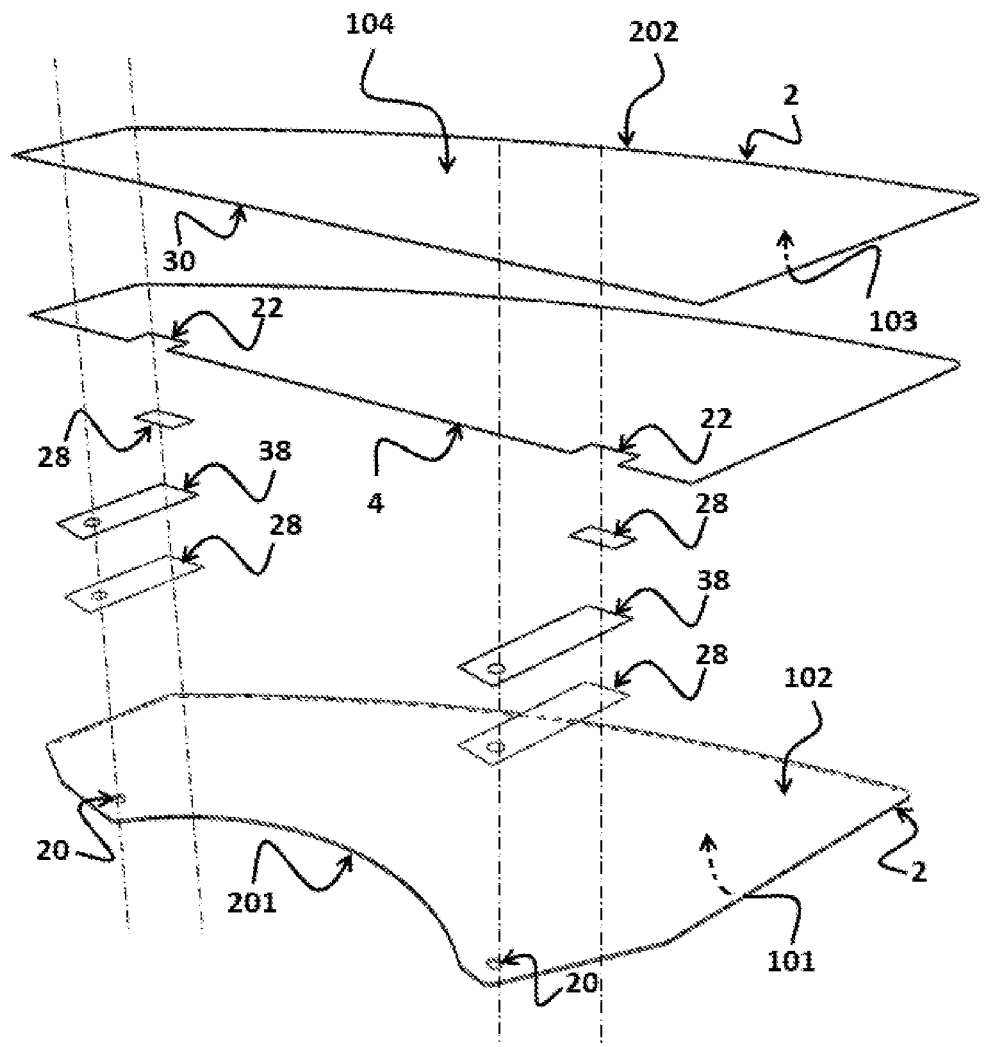
FIG. 13 shows an exploded view of an alternative embodiment of a laminated door window with retention layer.

In additional embodiments, if the thickness of the laminated portion of the reinforcement layer is thin enough, no change to the plastic bonding interlayer 4 may be needed. Otherwise, a cutout 22 is made in the plastic bonding interlayer 4 as shown in the exploded view of FIG. 13.

Once mounted in the vehicle, the mounting means 32 places the glass and retention system 36 in compression further strengthening the assembly and improving the resistance to breakage as well as the overall stiffness.

The reinforcement layer 38 can be fabricated from any suitable material that can provide the strength needed. Potential materials include but are not limited to: carbon fiber composite, steel, aluminum, titanium, glass, plastic, polyamide, polyimide, polycarbonate, polyethylene terephthalate (PET) and fiberglass reinforced plastic all of which may be suitable depending upon the exact application and loading.

The chemically or thermally strengthened outer glass layer, when broken is likely to detach from the mounting means. An external impact is likely to only break the outer glass layer as the outer layer will absorb and dissipate the energy from most impacts. The broken outer layer will be held together in the portion of the glazing that is laminated by the intact inner layer and the interlayer. The retention layer bonded to both glass layers and attached to the mounting means will allow the glazing to remain in place in the opening and possibly for limited movement until it can be replaced.

Figure 1:
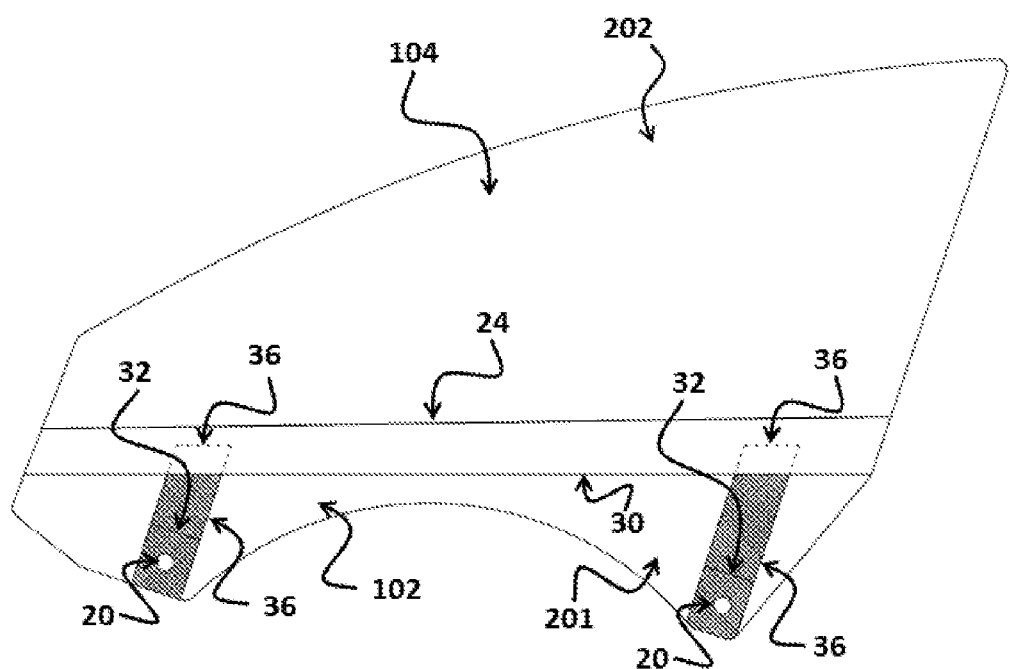
FIG. 1 shows a laminated door window with retention layer, variant 1.

FIG. 1 shows a movable door window comprising an outer glass layer 201, an inner glass layer 202 having a lower edge 30 which extends such that it is not captured by the mounting means 32, and a plastic bonding layer 4 serving to bond the surface two 102 of the outer glass layer 201 layer to the surface three 103 of the inner glass layer 202 layer.

This sidelite has at least one hole 20. FIGS. 1-6 show different designs for the retention system 36 comprising at least one adhesive layer 28 and at least one reinforcement layer 38. The adhesive layer 28 attaches the reinforcement layer 38 to the glass. In embodiments depicted in FIGS. 1, 3 and 5, the retention system 36 overlaps the lower area of the plastic bonding layer 4 (such as a PVB layer) by at least 10 mm within the lower edge 30 of the inner glass layer 202. The retention system 36 extends below that edge and is at least partially captured by the mounting means 32 and the outer glass layer 201.

Figure 6:
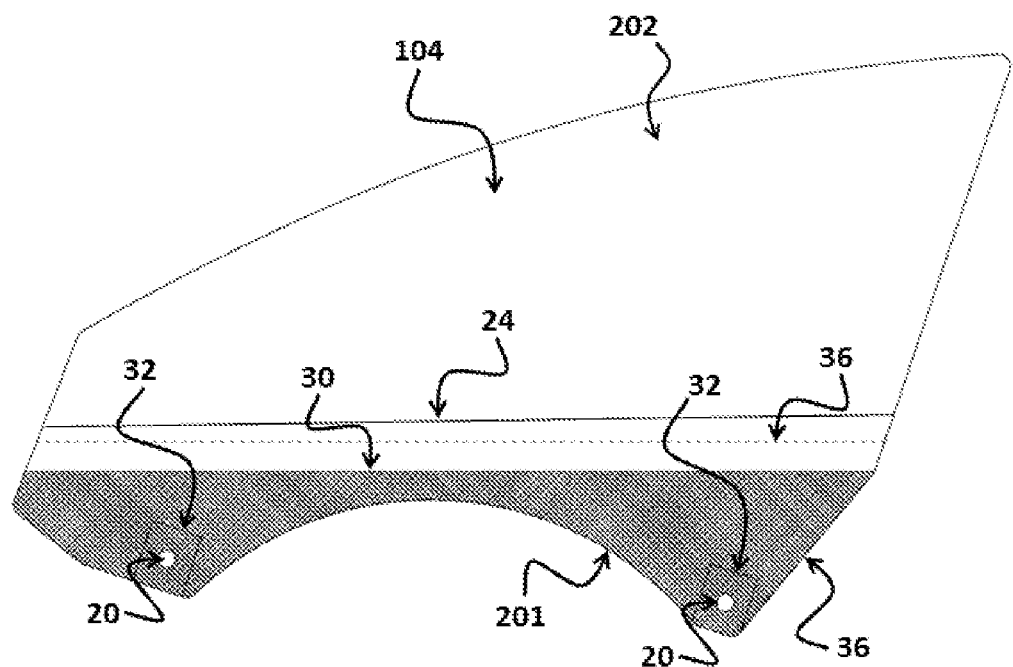
FIG. 6 shows a laminated door window with retention layer, variant 6.

FIG. 6 shows an alternative design for the retention system 36 where the width of the retention is the same as the width of the outer glass layer 201.

Figure 7:
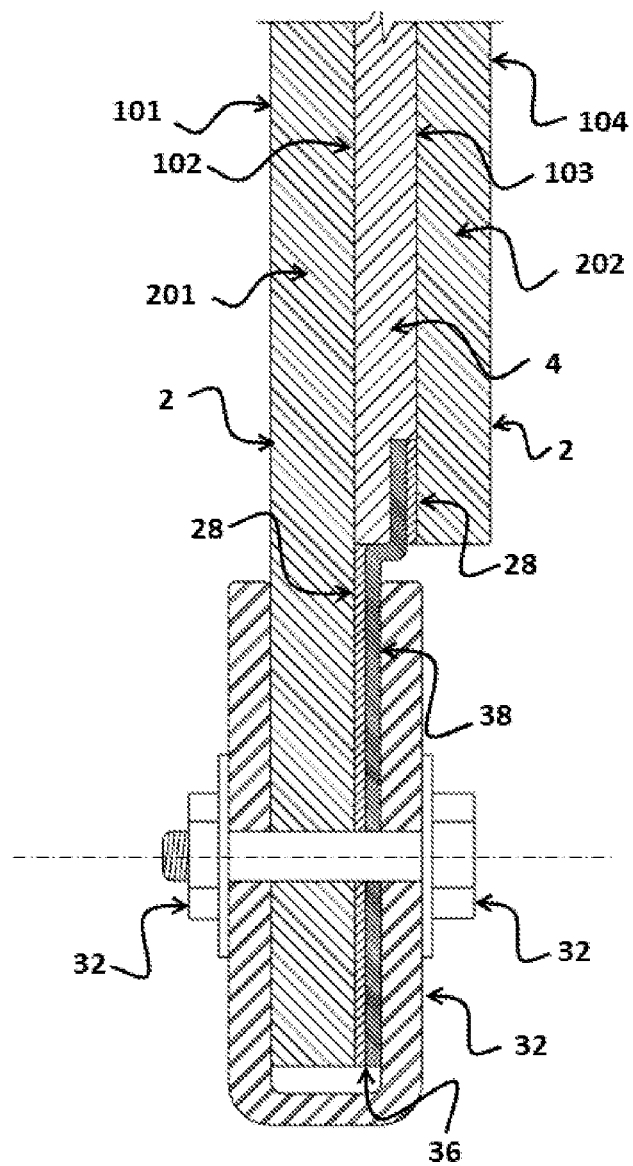
FIG. 7 shows the cross-section variant 1.

FIG. 7 shows a cross section view of the sidelite of FIG. 1. At the bottom, in the non-laminated section, a first adhesive layer 28 is attached to the surface two 102 of the outer glass layer 201. In the laminated portion, a second adhesive layer 28 is attached to the surface three 103 of the inner glass layer 202 and overlaps the plastic bonding layer 4 (such as a PVB layer) by at least 10 mm. The reinforcement layer 38 is attached by adhesive layers 28 as shown.

Figure 2:
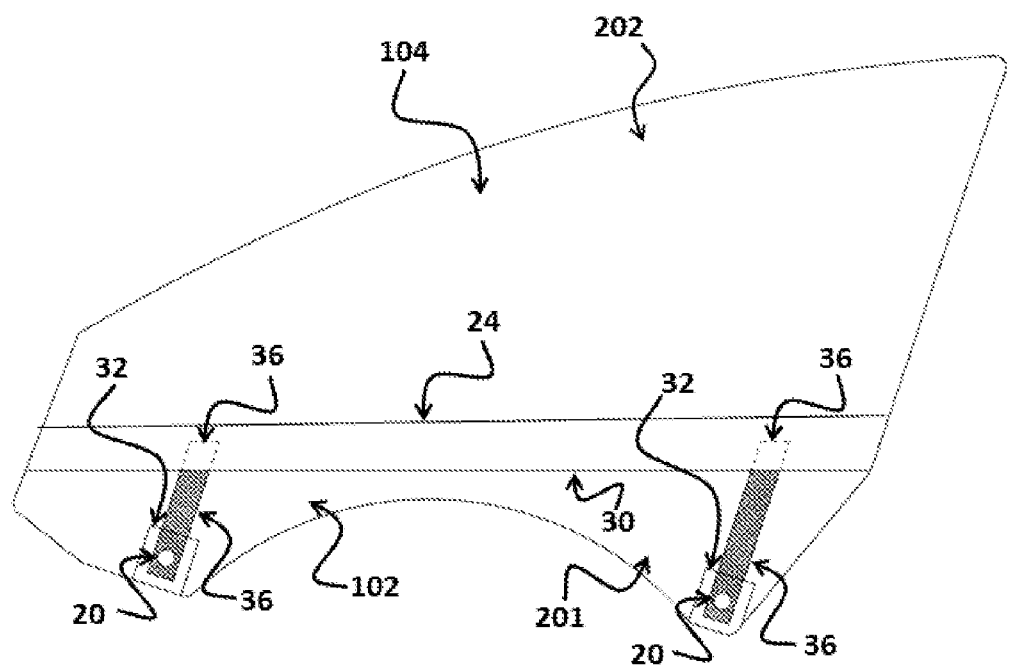
FIG. 2 shows a laminated door window with retention layer, variant 2.
Figure 8:
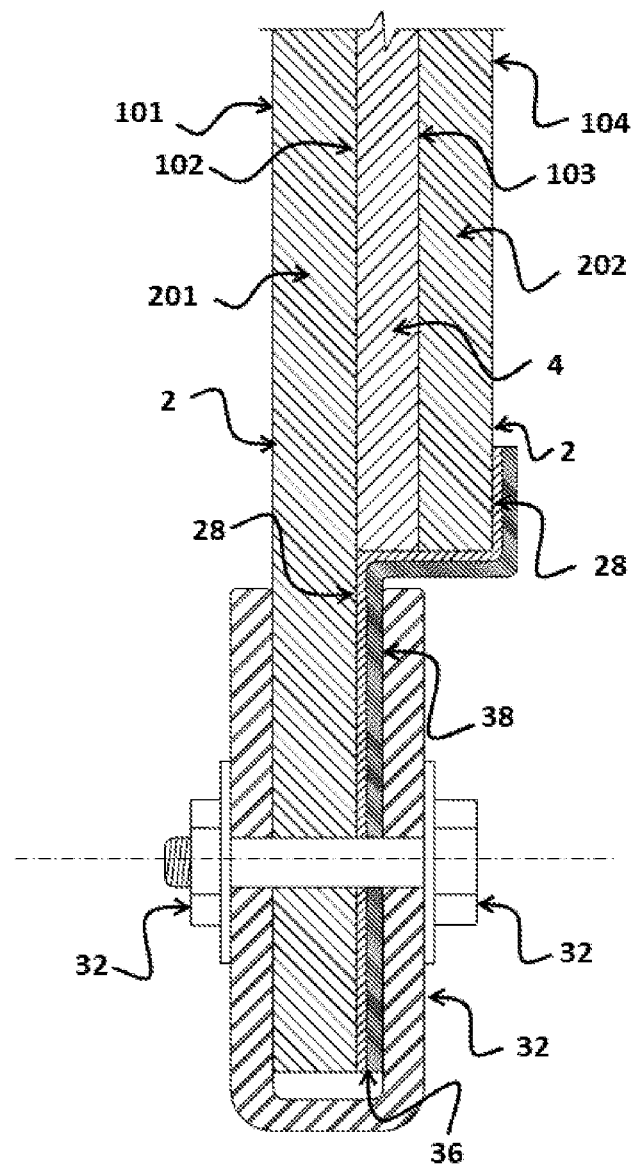
FIG. 8 shows the cross-section variant 2.

FIG. 8 shows a cross section view of the sidelite of FIG. 2. At the bottom, in the non-laminated section, an adhesive layer 28 is attached to the surface two 102 of the outer glass layer 201. In the laminated section, the adhesive layer 28 is attached to the surface four 104 of the inner glass layer 202 at least 10 mm above the inner lower edge. The reinforcement layer 38 is attached by the adhesive layer 28 as shown.

Figure 3:
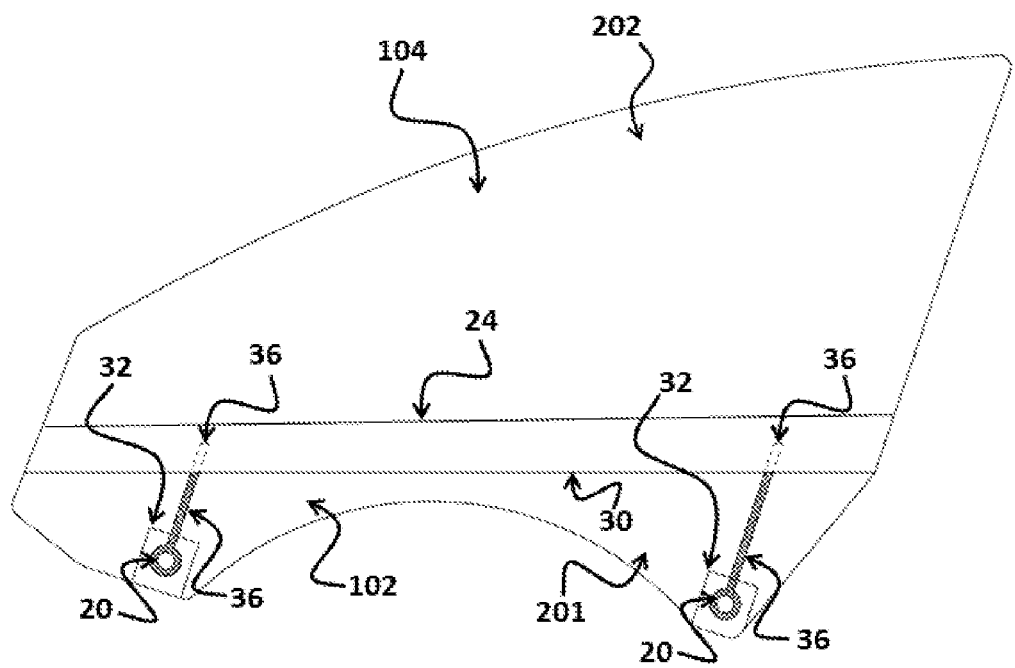
FIG. 3 shows a laminated door window with retention layer, variant 3.
Figure 9:
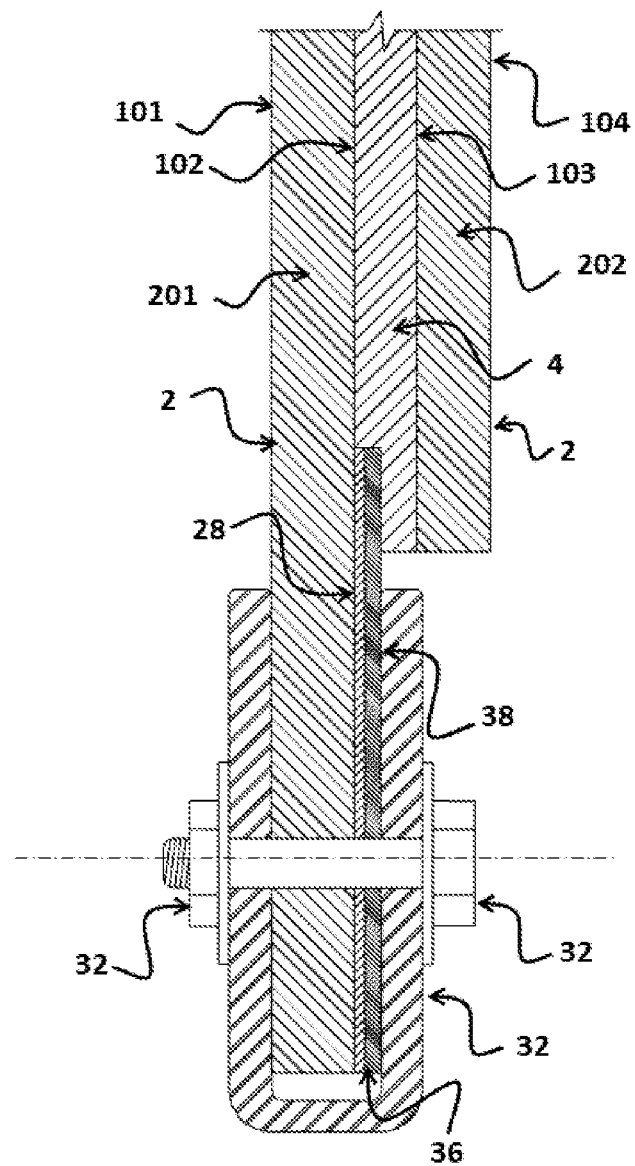
FIG. 9 shows the cross-section variant 3.

FIG. 9 shows a cross section view of the sidelite of FIG. 3. At the bottom, in the non-laminated section, an adhesive layer 28 is attached to the surface two 102 of the outer glass layer 201. In the laminated section, the adhesive layer 28 is attached to the surface two 102 of the outer glass layer 201 at least 10 mm above the inner lower edge and overlapping the plastic bonding layer 4 (such as a PVB layer). The reinforcement layer 38 is attached by the adhesive layer 28 as shown.

Figure 4:
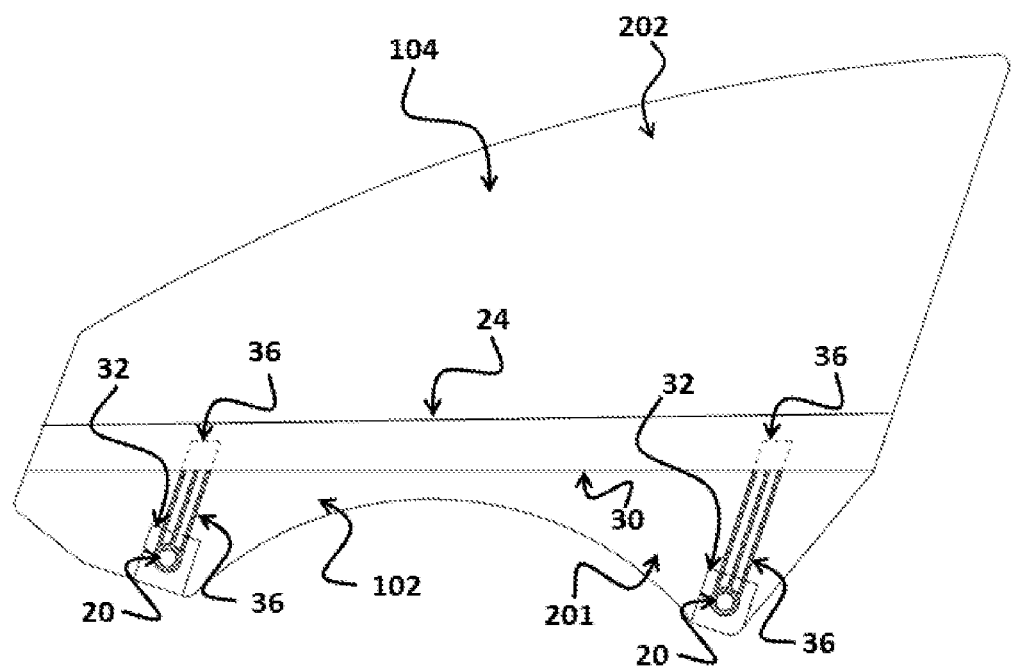
FIG. 4 shows a laminated door window with retention layer, variant 4.
Figure 5:
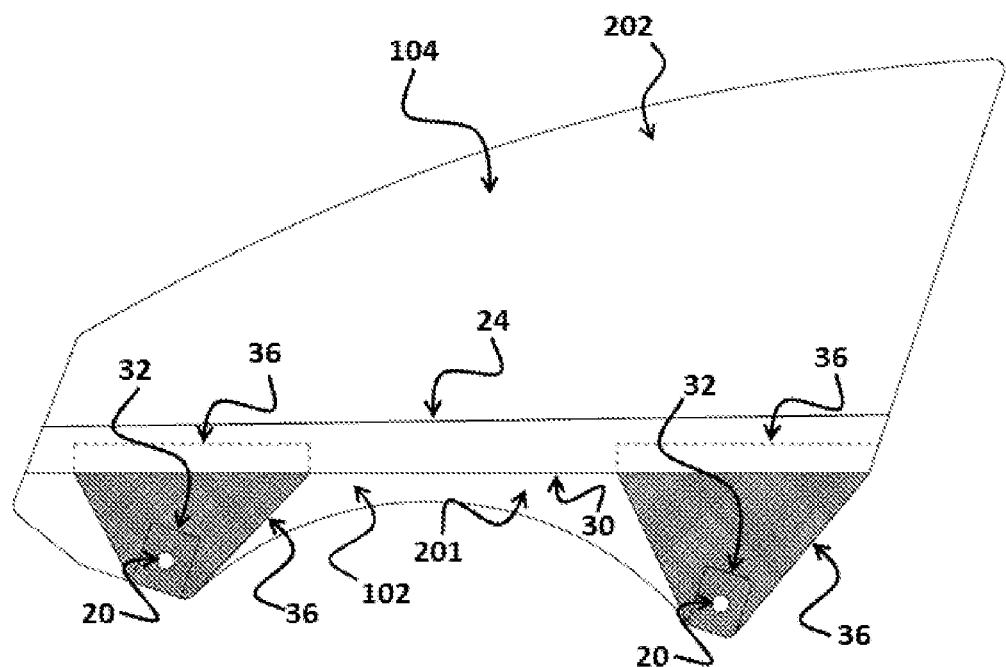
FIG. 5 shows a laminated door window with retention layer, variant 5.
Figure 10:
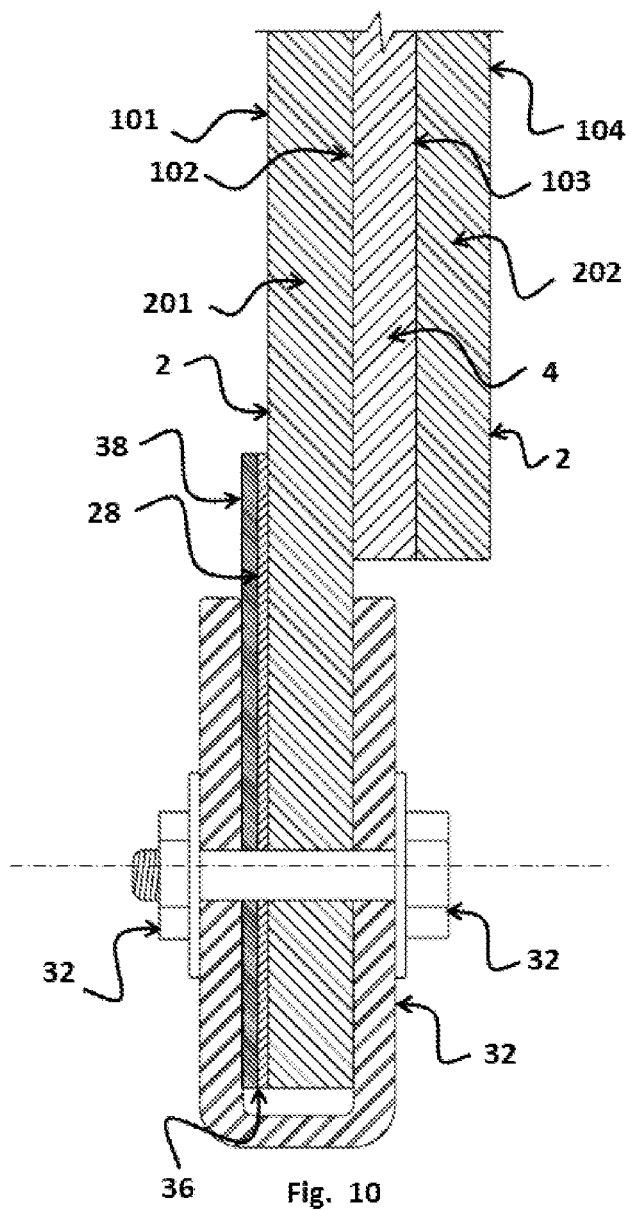
FIG. 10 shows the cross-section variant 4.

FIG. 10 shows a cross section view of the sidelite of FIG. 4. At the bottom, in the non-laminated area, an adhesive layer 28 is attached to the surface one 101 of the outer glass layer 201. In the laminated area, the adhesive layer 28 is attached to the surface one 101 of the outer glass layer 201 at least 10 mm above the inner lower edge. The reinforcement layer 38 is attached by the adhesive layer 28 as shown.

Below the lower edge of the inner glass layer 202, the retention system 36 can cover all the height of the non-laminated glass, having holes concentric to the outer glass layer hole.

Figure 11:
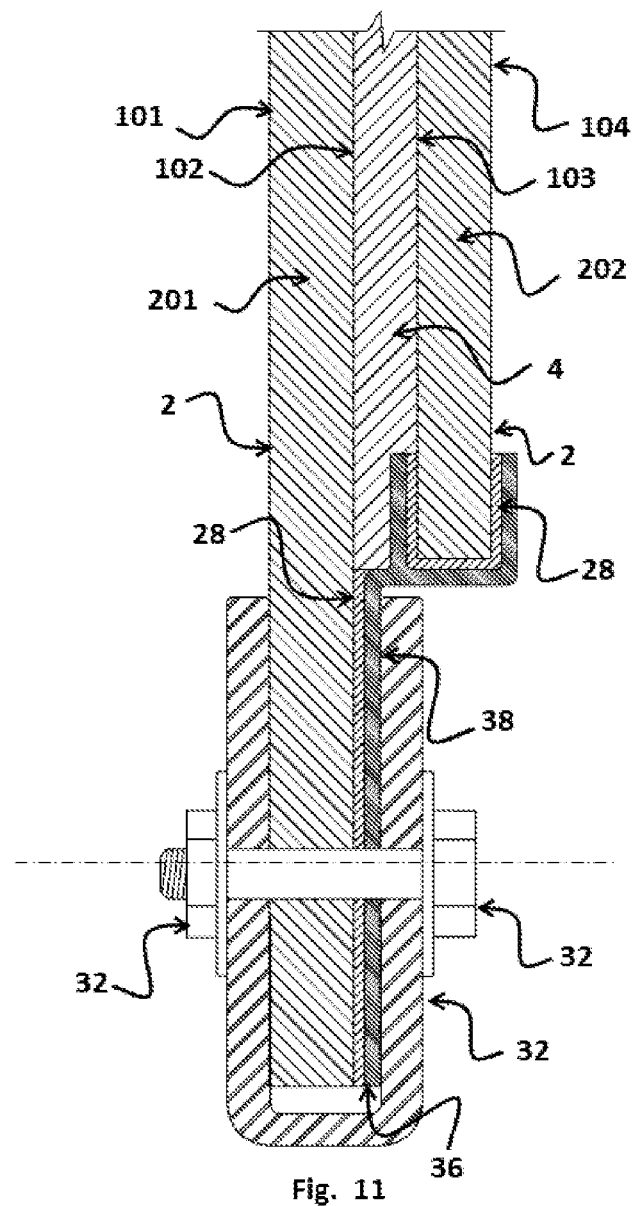
FIG. 11 shows the cross-section variant 5.

FIG. 11 shows a combination of arrangements 1 and 2 (FIGS. 7 and 8); an adhesive layer 28 is bonded to surfaces three 103 and four 104 of the lower edge of the inner glass layer 202 within the laminated section. At the bottom, in the non-laminated area, an additional adhesive layer 28 is attached to the surface two 102 of the outer glass layer 201. The reinforcement layer 38 is attached by the adhesive layer 28 as shown.

Figure 12:
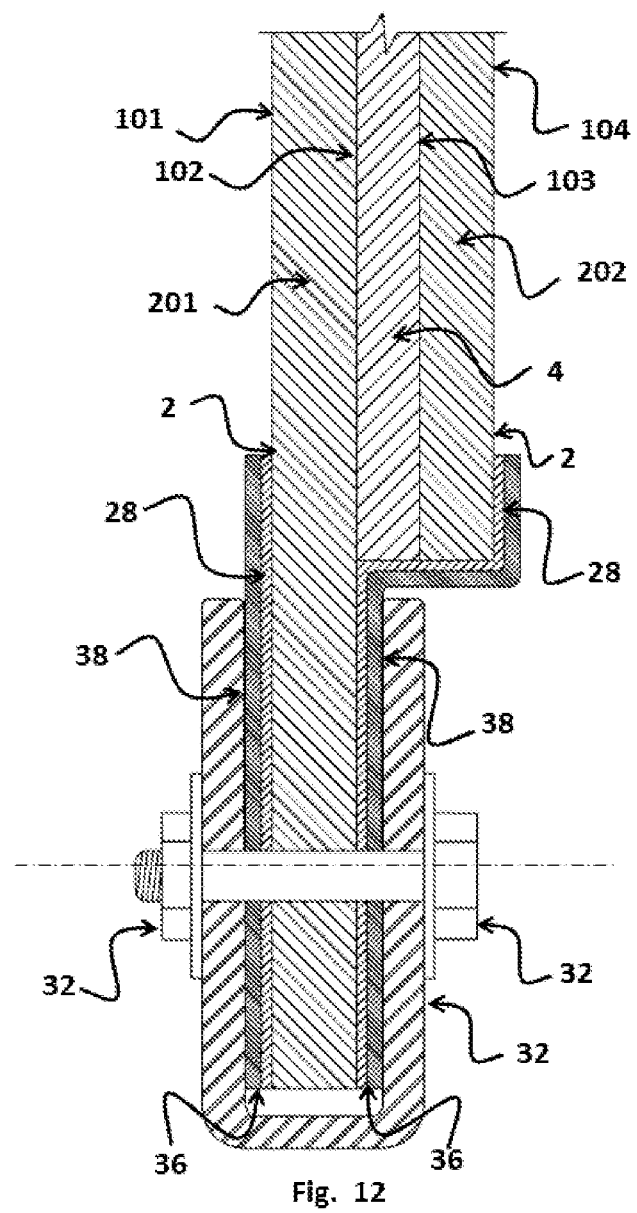
FIG. 12 shows the cross-section variant 6.

The configuration for the retention system 36 shown in FIG. 12 is a combination of arrangements 2 and 4 (FIGS. 8 and 10); one adhesive layer 28 is bonded to surfaces one 101 of the outer glass layer 201, the other adhesive layer 28 is bonded to surface two 102 of outer glass layer 201 and the lower edge and surface four 104 of the inner glass layer 202 covering at least 10 mm above the inner lower edge.

DETAILED DESCRIPTION OF THE EMBODIMENTS

Preferred Embodiments Description

1. A movable door window (sidelite) as illustrated in FIGS. 1 and 7. The thermally strengthened outer glass layer 201 layer is comprised of 3.5 mm soda-lime solar green glass 201 with two 20 mm holes 20 used to mount the glass to the lift rail mounting means 32 in the window mechanism.

The inner glass layer 202 is comprised of clear 1.1 mm chemically strengthened aluminosilicate glass. The edge of the inner glass layer 202 layer is offset inboard from the outer glass layer 201 edge of glass by 1.5 mm along the top and sides. The bottom edge of the inner glass layer 202 extends below 20 mm below the beltline.

The mounting means 32 is attached to the laminate through the holes 20 and capturing the outer glass layer 201 and a retention system 36 comprising adhesive layers 28 and a reinforcement layer 38. The inner glass layer 202 does not have a hole in it and it is not captured by the mounting means 32.

The plastic bonding layer 4 is a polyvinyl butyral film (PVB) of 0.76 m that is used to laminate the two glass layers to each other.

The adhesive layer 28 is an acrylic adhesive film having a thickness of 0.13 mm and a width of 60 mm. The reinforcement layer 38 is a polyimide film of 0.2 mm having a high tensile strength at break of 240 MPa.

At the bottom, in the non-laminate area, a first adhesive layer 28 for rear and front mounting means 32 is attached to the surface two 102 of the outer glass layer 201. In the laminated section, a second adhesive layer 28 is attached to the surface three 103 of the inner glass layer 202 and overlaps the PVB 4 by 10 mm. The reinforcement layer 38 is attached to the adhesive layers 28 as shown in FIG. 7.

2. Embodiment 2 is the same as embodiment 1 with the exception of the reinforcement layer 38 corresponding to the rear holes which has a width of 200 mm and the reinforcement layer 38 corresponding to the front hole which has a width of 100 mm.

3. Embodiment 3 is the same as embodiment 1 with the exception of the reinforcement layer 38 covering all the non-laminated area and overlaping 20 mm with the laminated area above the lower edge of the inner glass layer 202.

4. Embodiment 4 is the same as embodiment 1 wherein the reinforcement layer 38 is a 0.2 mm sheet of steel having a width of 100 mm.

5. Embodiment 5 is the same as previous embodiments wherein the adhesive layer 28 is a 0.1 mm layer of polyurethane.

6. Embodiment 6 is the same as embodiment 1 with the exception that the arrangement for the adhesive 28 and reinforcement 38 layers for both, rear and front holes, are configured as shown in FIG. 8, where the adhesive layer 28 is attached to the surface four 104 of inner glass layer 202 in the laminated portion.

7. Embodiment 7 is the same as embodiment 1 with the exception that the arrangement for the adhesion 28 and reinforcement 38 layers corresponding to the rear hole is configured as shown in FIG. 8, and the corresponding to the front holes is arranged as shown in FIG. 7.

8. Embodiment 8 is the same as embodiment 1 with the exception that the arrangement for the adhesion 28 and reinforcement layers 38 for both holes are as shown in FIG. 9, where the adhesive layer 28 is attached to the surface two 102 of outer glass layer 201 within 20 mm the laminated section.

9. Embodiment 9 is the same as embodiment 1 with the exception that the arrangement for the adhesion 28 and reinforcement 38 layers for both holes are as shown in FIG. 10, where the adhesive layer 28 is attached to the surface one 101 of outer glass layer 201 extending upwards 30 mm above the lower edge of the inner glass layer 202.

10. Embodiment 10 is the same as embodiment 1, with the exception that a combination of arrangements for retention system 36 are used: the retention system 36 corresponding to the rear mounting mean is configured as shown in FIG. 7 and the corresponding to the front mounting mean is configured as shown in FIG. 8.

11. Embodiment 11 is the same as embodiment 1, with the exception that the arrangement for the adhesion 28 and reinforcement 38 layers for both holes are as shown in FIG. 12, where one adhesive layer 28 is attached to surface one 101 and other adhesive layer 28 is attached to surface four 104 within the laminated section.

12. Embodiment 12 is the same as embodiment 1, with the exception that the arrangement for the adhesion 28 and reinforcement 38 layers for both holes are as shown in FIG. 11, where the adhesive layer 28 is bonded to both surfaces of the inner glass layer 202 20 mm above the lower edge of the laminated section.

REFERENCE NUMERALS OF DRAWINGS

2 Glass
4 Plastic bonding interlayer
6 Obscuration
12 Film
18 Coating
20 Hole
22 Cutout
24 Beltline
28 Adhesive
30 Edge of glass
32 Glazing mounting means
36 Retention layer
38 Reinforcement layer
101 Surface one
102 Surface two
103 Surface three
104 Surface four
201 Outer layer
202 Inner layer

The invention claimed is:

1. An automotive glazing having a vision area when installed as a window in a vehicle, the automotive glazing comprising:
    an outer glass layer which is strengthened having at least one hole configured to receive mounting means for holding the automotive glazing on the vehicle;
    an inner glass layer which is strengthened having a lower edge which extends below the vision area of the automotive glazing, said lower edge does not overlap the area captured by mounting means;
    at least one plastic bonding layer disposed between the inner and outer glass layers, wherein the plastic bonding layer has substantially the same shape as the inner glass layer such that the inner glass layer and said at least one plastic bonding layer define a laminated section of the automotive glazing; and
    a retention system comprising at least one adhesive layer and at least one reinforcement layer which overlaps the lower part of the laminated section and extends below such that it is captured by mounting means, wherein:
        each adhesive layer of said at least one adhesive layer attaches a reinforcement layer of said at least one reinforcement layer to at least one surface of the outer or/and inner glass layer,
        the thickness of the said at least one reinforcement layer is less than that of the at least plastic bonding layer,
        said at least one reinforcement layer has a tensile strength at break greater than that of the at least one plastic bonding layer strength,
        said at least one reinforcement layer is more thermally stable and less compressible than the at least one plastic bonding layer, and
        the reinforcement layer is comprised of at least one of the following materials: polyimide, polyamide, carbon fiber composite, and titanium.

2. The laminated glazing according to claim 1, wherein the outer glass layer thickness is between 2.5 mm and 6 mm, preferably between 2.5 mm and 5 mm.

3. The laminated glazing according to claim 1, wherein the inner glass layer thickness is between 0.5 mm and 1.6 mm, preferably between 0.5 mm and 1.1 mm.

4. The laminated glazing according to claim 1, wherein the reinforcement layer has a tensile strength at break between 30 and 1000 MPa, preferably between 150 and 1000 MPa.

5. The laminated glazing according to claim 1, wherein the adhesive layer has a peel adhesion to glass about equal to that of the plastic bonding layer.

6. The laminated glazing according to claim 1, wherein the adhesive layer has a peel adhesion to glass greater than that of the plastic bonding layer.

7. The laminated glazing according to claim 1, wherein the adhesive layer is comprised of at least one of the following materials: acrylic adhesive film, double-sided tape, polyurethane, resin, acrylic, thermoplastic.

8. The laminated glazing according to claim 1, wherein the reinforcement layer overlaps the surface of a non-laminated section of the automotive glazing.

9. The laminated glazing according to claim 1, wherein the reinforcement layer has holes concentric to the outer glass layer holes.

10. The laminated glazing according to claim 1, wherein the reinforcement layer extends at least 10 mm above the lower edge of the inner glass layer.

11. The laminated glazing according to claim 1, wherein the lower edge of the inner glass layer is extended by at least 20 mm below the beltline of the laminated glazing.

12. The laminated glazing according to claim 1, wherein the outer glass layer is thermally strengthened to a compressive stress of between 60 and 150 MPa, preferably between 100 and 140 MPa.

13. The laminated glazing according to claim 1, wherein the inner glass layer is chemically strengthened to a compressive stress of between 400 and 900 MPa, preferably between 500 to 800 Mpa.

14. The laminated glazing according to claim 1, wherein the inner glass layer is cold bent.

15. The laminated glazing according to claim 1, wherein the edge of the inner glass layer is offset inboard from the edge of the outer glass layer along a portion of the glass edge.

16. The laminated glazing according to claim 15, wherein the inner glass layer offset is in the range of 0.5 mm to 3.0 mm, preferably in the range of 0.5 mm to 1.5 mm.

17. The laminated glazing according to claim 1, wherein the inner glass layer has a chamfered or bullnose edge finish along at least the exposed portion of the edge.

18. The laminated glazing according to claim 1, wherein an adhesive layer of said at least one adhesive layer is made from a slit in a plastic bonding layer of said at least one plastic bonding layer.

19. An automotive glazing having a vision area given by a beltline when installed as a door window in a vehicle, the automotive glazing comprising:

an outer glass layer which is strengthened having at least one hole configured to receive mounting means for holding the automotive glazing on the vehicle;

an inner glass layer which is strengthened having a lower edge which extends below the beltline of the automotive glazing, said lower edge does not overlap the area captured by mounting means;

at least one plastic bonding layer disposed between the inner and outer glass layers, wherein the plastic bonding layer has substantially the same shape as the inner glass layer such that the inner glass layer and said at least one plastic bonding layer define a laminated section of the automotive glazing; and a retention system comprising at least one adhesive layer and at least one reinforcement layer which overlaps only part of the laminated section below the beltline and extends below the lower edge of the inner glass layer such that it is captured by mounting means, wherein:

each adhesive layer of said at least one adhesive layer attaches a reinforcement layer of said at least one reinforcement layer to at least one surface of the outer or/and inner glass layer, the thickness of the said at least one reinforcement layer is less than that of the at least plastic bonding layer, said at least one reinforcement layer has a tensile strength at break greater than that of the at least one plastic bonding layer strength, and said at least one reinforcement layer is more thermally stable and less compressible than the at least one plastic bonding layer.

\* \* \* \* \*